(12) United States Patent
Dyshkant et al.

(10) Patent No.: US 8,085,398 B2
(45) Date of Patent: Dec. 27, 2011

(54) CONCAVE COMPENSATED CELL FOR THE COLLECTION OF RADIATED LIGHT

(75) Inventors: Alexander S. Dyshkant, DeKalb, IL (US); Vishnu Zutshi, DeKalb, IL (US); Phillip Stone, DeKalb, IL (US)

(73) Assignee: Northern Illinois University, DeKalb, IL (US)

( * ) Notice: Subject to any disclaimer, the term of this patent is extended or adjusted under 35 U.S.C. 154(b) by 245 days.

(21) Appl. No.: 12/473,888

(22) Filed: May 28, 2009

(65) Prior Publication Data

US 2009/0296087 A1    Dec. 3, 2009

Related U.S. Application Data

(60) Provisional application No. 61/057,635, filed on May 30, 2008.

(51) Int. Cl.
*G01N 21/00* (2006.01)

(52) U.S. Cl. .......................... 356/338; 356/343; 356/246

(58) Field of Classification Search .......... 356/338–343, 356/246
See application file for complete search history.

(56) References Cited

U.S. PATENT DOCUMENTS

2003/0235272 A1 * 12/2003 Appleby et al. .............. 378/147

FOREIGN PATENT DOCUMENTS

JP    2000-019108    *  7/1998

* cited by examiner

*Primary Examiner* — Gregory J Toatley
*Assistant Examiner* — Iyabo S Alli
(74) *Attorney, Agent, or Firm* — Kohn & Associates, PLLC

(57) ABSTRACT

A concave cell for the collection of radiated light including a body with a concave surface and an unmodified flat surface opposite thereto, and a reflective surface coupled to the body across from the concave surface, said reflective surface including an opening and a photo detector operatively coupled thereto. A method of collecting light by reflecting light inside the concave cell, striking the light at the concave surface, scattering the light at the concave surface, and registering the scattered light with the photo detector. A method of increasing uniformity of light registered in a photo detector. A method of making a concave cell.

30 Claims, 11 Drawing Sheets

CONCAVE COMPENSATED CELL FOR THE COLLECTION OF RADIATED LIGHT

CROSS-REFERENCE TO RELATED APPLICATIONS

This application claims the benefit of priority under 35 U.S.C. Section 119(e) of U.S. Provisional Patent Application No. 61/057,635, filed May 30, 2008, which is incorporated herein by reference.

STATEMENT REGARDING FEDERALLY SPONSORED RESEARCH OR DEVELOPMENT

Research in this application was supported in part by a grant from the University of Oregon (Grant No. PHY-0529471 funded by NSF/DOE) and a grant from Department of Education (Grant No. P116Z050086). The Government has certain rights in the invention.

BACKGROUND OF THE INVENTION

1. Field of the Invention

The present invention relates to light collection through the use of scintillators. In particular, the present invention relates to detecting the presence of energetic charged particles through their emission of scintillation light and the collection of that light.

2. Description of the Prior Art

A charged particle moving through an active media loses energy. Scintillator-based active media release part of these losses in the form of visible light. Most scintillators are made of inorganic crystals or organic plastics. The light, represented by the white line in FIG. 1, is bounced back and forth inside a scintillating cell to be either completely absorbed or to be registered by the photo detector if the photon scatters into it. Because the active area of the photo detector is usually significantly (100-1000 times) less than the cell area, to which the detector is directly coupled, the probability of registration is low. The area of the cell just in front of the photo detector is very visible to the photo detector. The farther area is less visible. As a result, the registered light yield across the cell area is non-uniform with respect to the particle impact position on the cell as illustrated in FIG. 2. If an air gap is introduced between the photo detector and the cell, the non-uniformity will be slightly less, but the light yield will be reduced rapidly with increasing gap size.

Present technology uses optical contact between an active media and photo detector or the addition of intervening media. Usually an optical glue or grease is used to improve light penetration from the active media to the photo detector, as shown in FIG. 1. Because the refractive index of the optical glue or grease is close to the refractive indexes of the active media and photo detector window, the light loss is less. While this increases the light collection efficiency in general, it does not reduce the non-uniformity in the registered light yield.

D'Ascenzo, et al. describes a highly granular hadronic calorimeter that consists of finely segmented arrays of plastic scintillators. A Geiger mode avalanche photodiode directly reads photons generated by the blue scintillators. For the direct coupling readout, the scintillating cell was totally wrapped in a Super-radiant VM2000 foil from 3M. To connect the photo detector, a window of $3\times3$ mm$^2$ was open in the scintillator reflective wrapping. The photo detector plastic coverage that protects the active area was in contact with the scintillator. No special optical coupling was used. The uniformity of the light collection with respect to the particle impact position on the cell was not studied but it can be surmised that since the surface that the light hits is flat, it will suffer from the deficiencies described above.

Danilov describes the large-scale use of silicon photomultipliers (SiPMs) as photo detectors for a plastic scintillator-based hadron calorimeter. Each scintillator tile includes a wavelength-shifting fiber inserted in a groove on the tile. An air gap separates the SiPMs from the scintillators. The SiPMs are connected to one of the fiber ends while the other end of the fiber is covered with a mirror in order to increase light yield.

The response uniformity for a square shaped scintillating cell of 9 cm$^2$ area and 3 mm thickness was studied for two cases and shown in FIG. 5 in Danilov. In the first case, the Kurary 1 mm outer diameter wavelength shifting fiber was glued into a 2 mm deep groove made diagonally in the cell. The photo detector with 1 mm$^2$ active area was also glued to the fiber end. The uniformity of response across the cell area was almost flat with about a 25% slope along the wavelength shifting fiber direction (from corner to corner). In the second case, the cell was directly read out with the photo detector that had a $2.1\times2.1$ mm$^2$ active area. The uniformity response of the cell with respect to the impact position of the charged particle was significantly worse than with the fiber readout.

There is a need for a more uniform method of light collection when using direct (i.e. fiberless) coupling.

BRIEF SUMMARY OF THE INVENTION

The present invention provides for a concave cell for the collection of radiated light including a body having a concave surface and an unmodified flat surface opposite thereto, and a reflective surface coupled to the body across from the concave surface, the reflective surface including an opening and a photo detector operatively coupled thereto.

The present invention provides for a method of collecting light, including the steps of reflecting light inside the concave cell, striking the light at the concave surface, scattering the light at the concave surface, and registering the scattered light with the photo detector.

The present invention also provides for a method of increasing uniformity of light registered in a photo detector, including the steps of reflecting light inside the concave cell, striking the light at the concave surface, scattering the light at the concave surface, and registering the scattered light with the photo detector with uniformity.

The present invention further provides for a method of making a concave cell, including the steps of preparing an unmodified flat surface and a concave surface opposite thereto from a body, coating the unmodified flat surface with reflective material, coupling a reflective surface to the body directly across from the concave surface, creating a volume of air between the concave surface and the reflective surface, and coupling a photo detector to the reflective surface at an opening in the reflective surface.

BRIEF DESCRIPTION ON THE DRAWINGS

Other advantages of the present invention will be readily appreciated as the same becomes better understood by reference to the following detailed description when considered in connection with the accompanying drawings, wherein.

DETAILED DESCRIPTION

Figure 3:
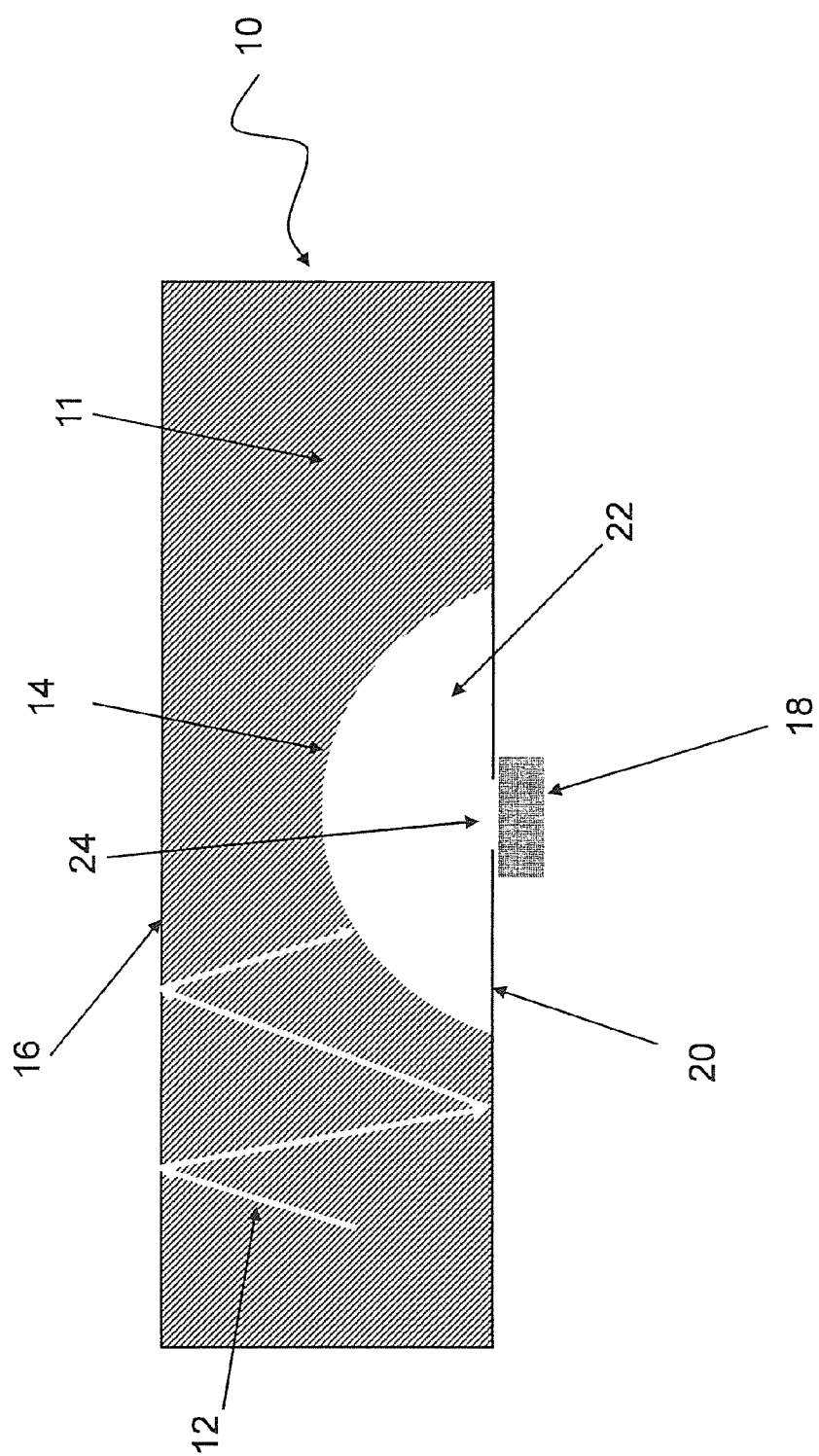
FIG. 3 is a representation of the concave cell of the present invention.

The present invention provides a concave cell 10, shown generally in FIG. 3, that provides an improvement in light collection and registration uniformity using photo detectors, and in particular registration through the light generated in active media such as a scintillator.

The concave cell 10 collects radiated light 12, and includes a body 11 having a modified concave surface 14 and an unmodified flat surface 16 opposite thereto. In FIG. 3, the modified concave surface 14 is facing towards the bottom of the concave cell 10, and the unmodified flat surface 16 is at the top of the concave cell 10. The body 11 further includes a reflective surface 20 coupled thereto that creates a volume of air 22 in between the concave surface 14 and the reflective surface 20. The reflective surface 20 includes an opening 24 and a photo detector 18 operatively coupled thereto. The opening 24 is present near the center of the reflective surface 20 so that the photo detector 18 can receive light from the concave cell 14, and is preferably between 1 to 5 mm in diameter. The photo detector 18 is part of a larger device not shown in the FIGURES. The concave cell 10 does not use an optical contact with a photo detector to improve light penetration, as does the prior art. It should be understood that "coupled to" does not necessarily mean directly operatively attached to, but rather in contact with, or directly adjacent to, another object.

Figure 5:
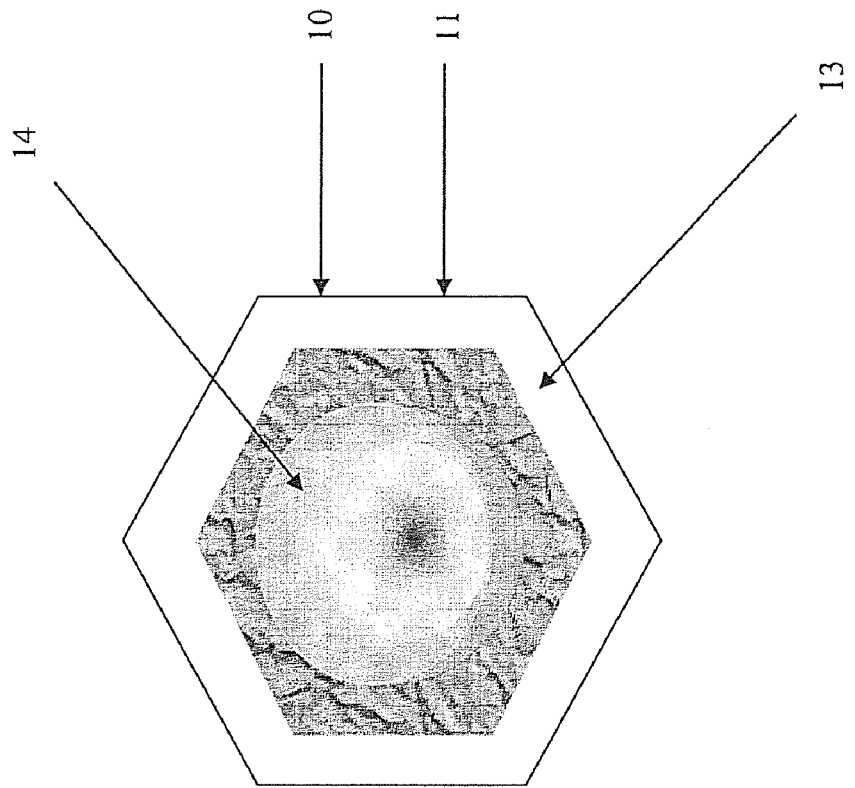
FIG. 5 is a photograph of a flat cell (to the left) and a concave cell (to the right)
Figure 5:
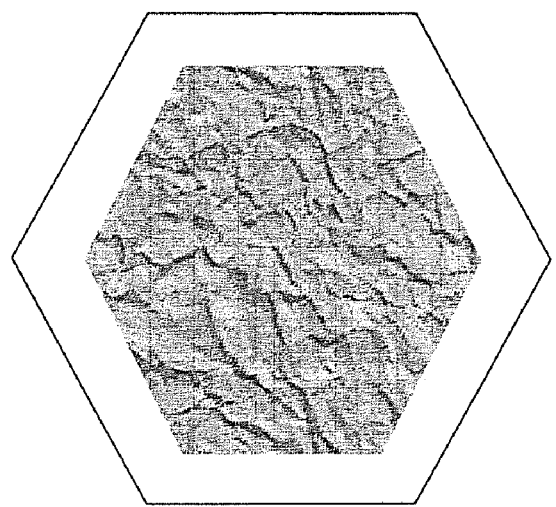

In the prior art, a photo detector faces a cell through a flat surface. In other words, the top surface and the bottom surface of the cell are flat in the cells of the prior art, just like the unmodified flat surface 16 in FIG. 3. The present invention removes part of the material in the cell volume just in front of the photo detector, making a concave surface on the top of the cell, as shown in FIG. 5. The photo detector now faces the cell, as shown in FIG. 3, through a volume of air 22 restricted by the concaved surface 14 of the cell 10. The cell surface is concaved at the center, but becomes flat closer to the edges. The concavity of the cell is further described below.

A modified volume of active media, produced by the concavity, just in front of the photo detector 18 is provided in such a way that the probability of light 12 scattering in all areas in front of the photo detector 18 is significantly higher. In addition, from the center of the cell 10, the field of detector vision is wider. The maximum achievable yield of light is less than with optical contact, but the uniformity of light yield through the area is significantly better. In the case of optimal depth of concavity, the light yield is uniform through the entire area, except the very edges. This also yields a higher light yield integrated over the entire cell. The adding of the concave surface 14 in the cell 10 simplifies the direct coupling, that is, without any intervening medium, between the cell 10 and the photo detector 18.

A "scintillator" as used herein, refers to a composition that absorbs radiation and releases that radiation at a shifted or longer wavelength. A device such as a photo detector can then detect the release of radiating light. A scintillator is also referred to as a "scintillating cell", "active media", or, in particular, the "concave cell" or "cell" 10 of the present invention, and each of these terms are interchangeable. In other words, the concave cell 10 of the present invention is a scintillator.

"Active media" as used herein, refers to any analyte that provides an active signal (i.e. light) from either the passage of an energetic charged particle or the absorption of short wave length photons. It can be any material in which a signal (i.e. light) can be produced and the material can be in a solid, liquid, or gaseous form. The cell 10 of the present invention is an active media, and is preferably solid.

Figure 6:
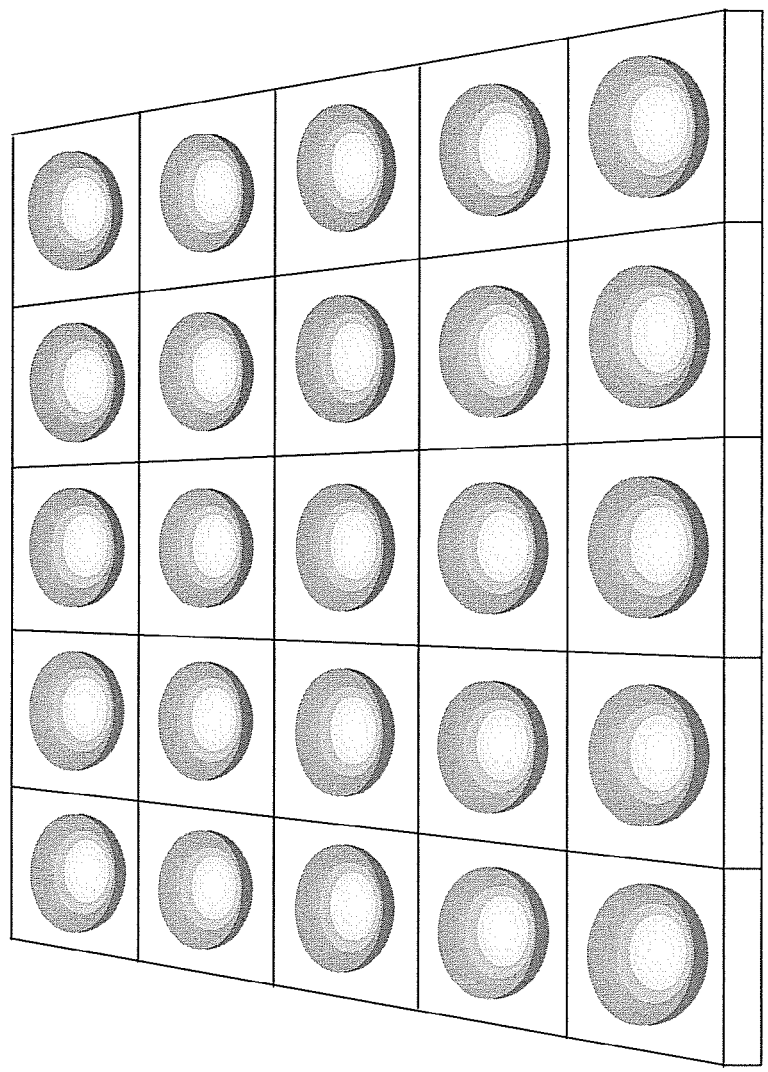
FIG. 6 is a photograph of multiple concave cells arranged together.

The concave cell 10 is preferably made of cast scintillator, and can be optionally made of an extruded scintillator or using an injection molding process with high production rate and lower cost. In the example below, the concave cells were mechanically cut out of a cast scintillator. The cell 10 can also be made of any suitable type of plastic through which light can exit. The cell 10 preferably has area of 4 to 9 cm$^2$ and a thickness of 3 to 5 mm. The cell 10 can also be other sizes with appropriate concavities as one skilled in the art can determine. The cell 10 can be hexagonal or square in shape, or any other suitable shape. The hexagonally shaped cell 10 has even more uniform response than a square, particularly in the corners. Multiple cells can be arranged together. As an example, an array of 5×5 square concave cells was mechanically cut out of cast scintillator and is shown in FIG. 6.

Various surfaces of the body 11 of the concave cell 10 can be covered in a reflective material, such as a reflective coating, foil, or paint. In the example below, the unmodified flat surface 16 of the cell was covered with VM2000® (3M), a reflective foil. The concave side of the cell 10 was covered with TYVEK® (DuPont) that had an opening 24 for the photo detector 18, i.e. this was the reflective surface 20. The concave surface 14 itself has no reflective material upon it. In other words, the reflective surface 20 lies directly opposite to the concave surface 14, parallel to the unmodified flat surface 16. It is a separate surface coupled to the concave cell 10, and can be a part of the device that the photo detector 18 is mounted on, further described below. The sides 13 of the body 11 were painted white using EJ510 paint, i.e. a reflective paint, from Eljen Technology. The coating on the sides can also be any other suitable reflective material. The material choice for the reflective coating on each surface is optional.

The concave cell 10 has any appropriate concave surface 14 as needed for the collection of light. For example, the concave surface 14 can be minimally concave or maximally concave according to the light collection requirements. For a concave cell 10 with an area of 9 cm$^2$ and thickness of 5 mm, the amount of concavity is at least 50% of the thickness. 60% concavity is preferred, allowing for an almost uniform response across the entire area of cell. A small adjustment within 0.125 mm can be provided because of the cast scintillator thickness tolerance.

In the present invention, the shape of concavity is a sphere that has a diameter of about 1 inch. For 5 mm thickness of the cell and a depth of the spherical dimple of about 3 mm at the center, the other outer part of the cell that is out of the dimple is still the same flatness. The 60% used depicts the ratio of the depth of dimple to the thickness of the cell. During the major tests, the concavity was spherical in shape and with the same diameter of the sphere. The depth of dimple with that concavity can be different. The optimal depth is approximately 60% of the scintillator thickness. As described below, the depth of the spherical dimple is more important than the diameter of the sphere. Preferably, the concave surface 14 is on one of the faces of the concave cell 10 but can, in principle, be on any one of the sides 13 or corners as long as the photo detector 18 coupled to the concave surface 14 is moved accordingly.

A window of the photo detector 18 is even and flush with the reflective surface 20 of the concave cell 10. In the example below, the photo detector 18 was a Hamamatsu S10362-11-50C that had 1 mm$^2$ active area. The photo detector 18 was placed on the center line of the cell. For the photo detector 18 used, the ratio of active area to the area of cell was 1:900. Any other suitable photo detector 18 can be used. When multiple cells 10 are used, as in FIG. 6, multiple photo detectors 18 are also used (one per concave cell 10).

To connect a small photo detector to a scintillating cell or tile directly, a common practice is to make a cavity in a scintillator and simply insert the detector into the cavity. That is a practical meaning of a direct coupling. The direct coupling can be with or without optical contact. The cell holds the detector in most cases. In the case of the concave cell 10 of the present invention, a plate with a flat surface holds the SiPM, and then covered with reflective material (i.e. the reflective surface 20 described above) that has an opening in front of the SiPM, and then the concave cell 10 mounted. The cell 10 is faced to the SiPM that is centered to the dimple.

Figure 4:
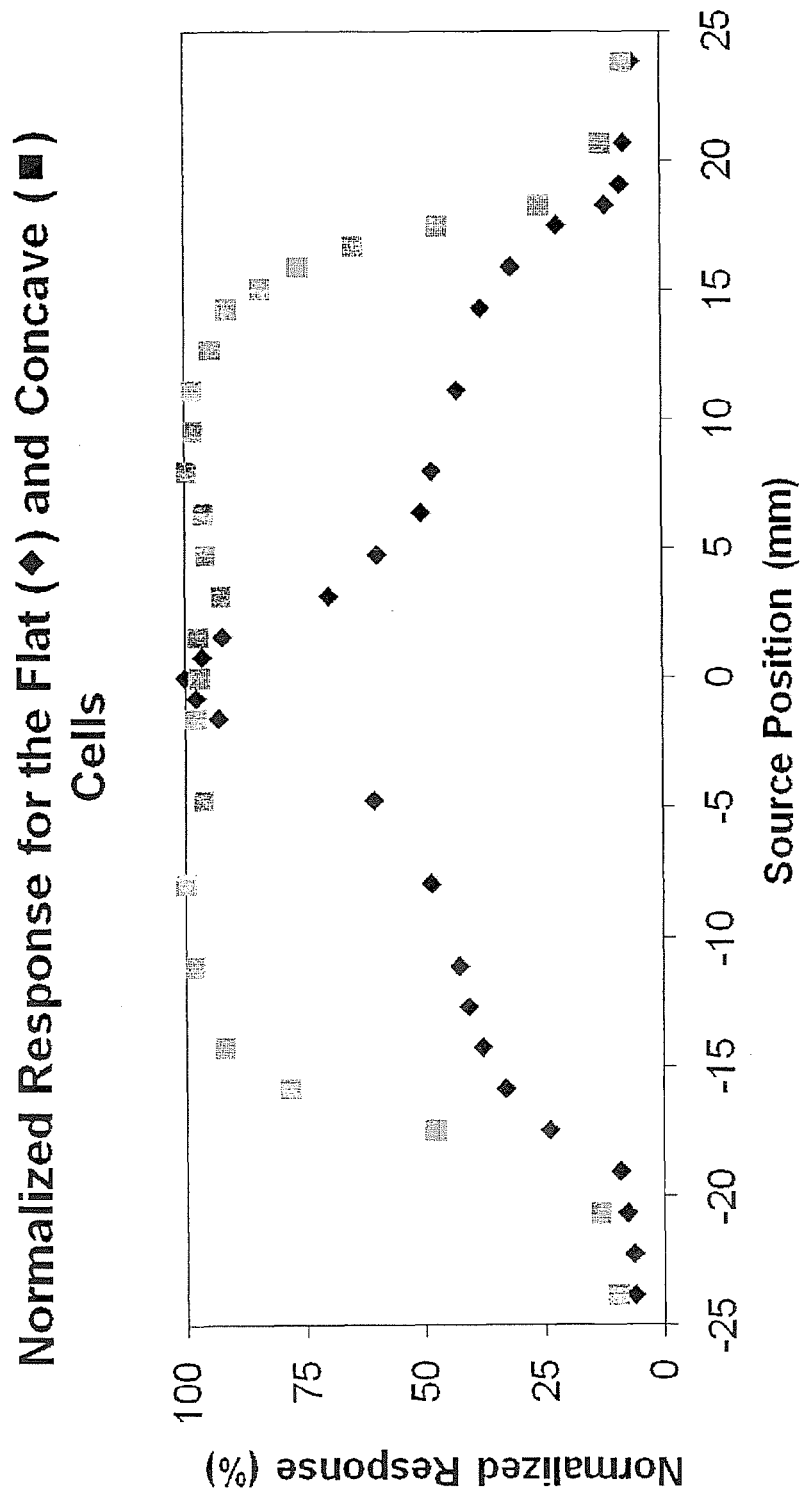
FIG. 4 is a graph of light uniformity response of flat and concave cells.

In use, light 12, represented by the white line in FIG. 3, is bounced back and forth inside the cell 10 to be either completely absorbed or to be registered with the photo detector 18 if after the scattering it points at the detector 18. The area of the cell 10 that has high visibility to the photo detector 18 is significantly larger due to the geometry, i.e. the concave surface 14. The large concave surface 14 is a source of additional light scattering that increases the registration probability. As a result for even a small concave indentation (i.e., a small concave surface 14), the registered light yield across the cell 10 area has improved in uniformity. In the case of optimal concave geometry, the light yield is uniform through the entire area, except the very edges as illustrated in FIG. 4. If the cell 10 has too deep of concavity, the uniformity is worse because of the lower response in the center.

The present invention provides generally for a method of collecting light by reflecting light 12 inside the concave cell 10, striking the light 12 at the concave surface 14, scattering the light 12 at the concave surface 14, and registering the scattered light 12 with the photo detector 18. The photo detector 18 is installed on the center line and is even with the thickest part of the concave side of the cell 10. In the prior art of light collection, the great majority of generated light is entrapped inside the flat cell because of full internal reflection. In the present invention, uniformity is achieved by diminishing the light generated in the center of the cell by reducing the amount of material through which the particle passes directly above the photo detector. Uniformity is also achieved by changing the optics such as the reflective and refractive characteristics of the cell due to the introduction of the concavity on one of its faces. The large concave surface of the present invention scatters the entrapped light, changing the direction, and in doing so releases additional light. A method of increasing uniformity of light registered in a photo detector is also performed with these steps, as the scattered light registered with the photo detector is registered with uniformity as described above.

The present invention also provides for a method of making a concave cell 10, including the steps of preparing the unmodified flat surface 16 and the concave surface 14 opposite thereto from the body 11, coating the unmodified flat surface 16 with reflective material, coupling reflective surface 20 to the cell 10 directly across from the concave surface 14, creating a volume of air 22 between the concave surface 24 and the reflective surface 20, and coupling a photo detector 18 to the reflective surface 20 at the opening 24 in the reflective surface 20. The concave surface 14 can be prepared by a variety of methods further described below, such as, but not limited to, fabricating with ball bits, injection molding, and heating and dimpling. The coatings of the unmodified flat surface 16 and reflective surface 14 have been described above, and the sides 13 of the body 11 can also be coated as described above.

There are several advantages to the concave cell 10 of the present invention. For example, the concave cell 10 provides significant improvement in the light collection uniformity across a cell or crystal. To match a photo detector with a small active area to a larger crystal or scintillator, an expensive light guide or optical fibers are not needed. It gives a uniform response with a minimum of components.

The invention also simplifies coupling of an active media to a photo detector. The concave cell 10 has less active media and more open space just in front of the photo detector.

The concave cell 10 also speeds up production and reduces assembly cost. The present invention simplifies the production of elements sensitive to charged particles. The invention saves in the cost of optical fiber and its polishing.

The invention may be used in any areas which are applications utilizing radiation monitored through the light generated in media. For example, applications can include solid state scintillation detectors, Cerenkov detectors, or scintillator-based calorimeters where the uniform response through the detector area is particular important because it puts an additional physical limit to the time or energy resolution. There are a number of commercial applications including radiation monitoring, medical physics, and educational products. There are several biochemical uses, for example mass spectroscopy and high performance liquid chromatography (HPLC), which rely on detecting energetic charged particles or photons.

The invention is further described in detail by reference to the following experimental examples. These examples are provided for the purpose of illustration only, and are not intended to be limiting unless otherwise specified. Thus, the present invention should in no way be construed as being limited to the following examples, but rather, be construed to encompass any and all variations which become evident as a result of the teaching provided herein.

EXAMPLE 1

Materials and Methods

The advantages of the present invention were demonstrated in step by step optimization in individual fabrication of each cell with a set of control measurements of the light uniformity. To get the uniformity of the response, a concave cell was used. IT was machined from cast scintillator using a double-rotation technique. The spherical concavity was produced by rotating the cell and the machine cutter at the same time. The tile was rotated in the vertical plane while the cutter was rotated in the horizontal plane. The axes of rotation are crossed at a right angle. At the beginning of the cutting process, the cutter touched the cell in the center. In the process of cutting, by moving the cell to the cutter, the desirable depth of concavity can be achieved.

Regular machine shop tools were used such as a ball shaped cutter. Any burr bit ball has a zero cutting speed on the top that always provides a well-defined non-uniform mark on the cell surface. To achieve a uniform concave surface, the burr bit ball was installed at 45° to the cell. The fabrication with a ball bit was an important step to fabricating cells in a modular design or in a form of an array of cells, which are connected to each other. The concave cell was designed for a well-segmented calorimeter, which can have millions of cells. After successful fabrication of an individual concave cell using a burr bit ball with about a 1 inch diameter, a module of 25 concave cells was produced. In attempt to reduce concave cell production cost, an injection mold process or heating up the cell(s) to about the melting point and dimpling the surface with high pressure will be tested.

Experiment

Figure 11:
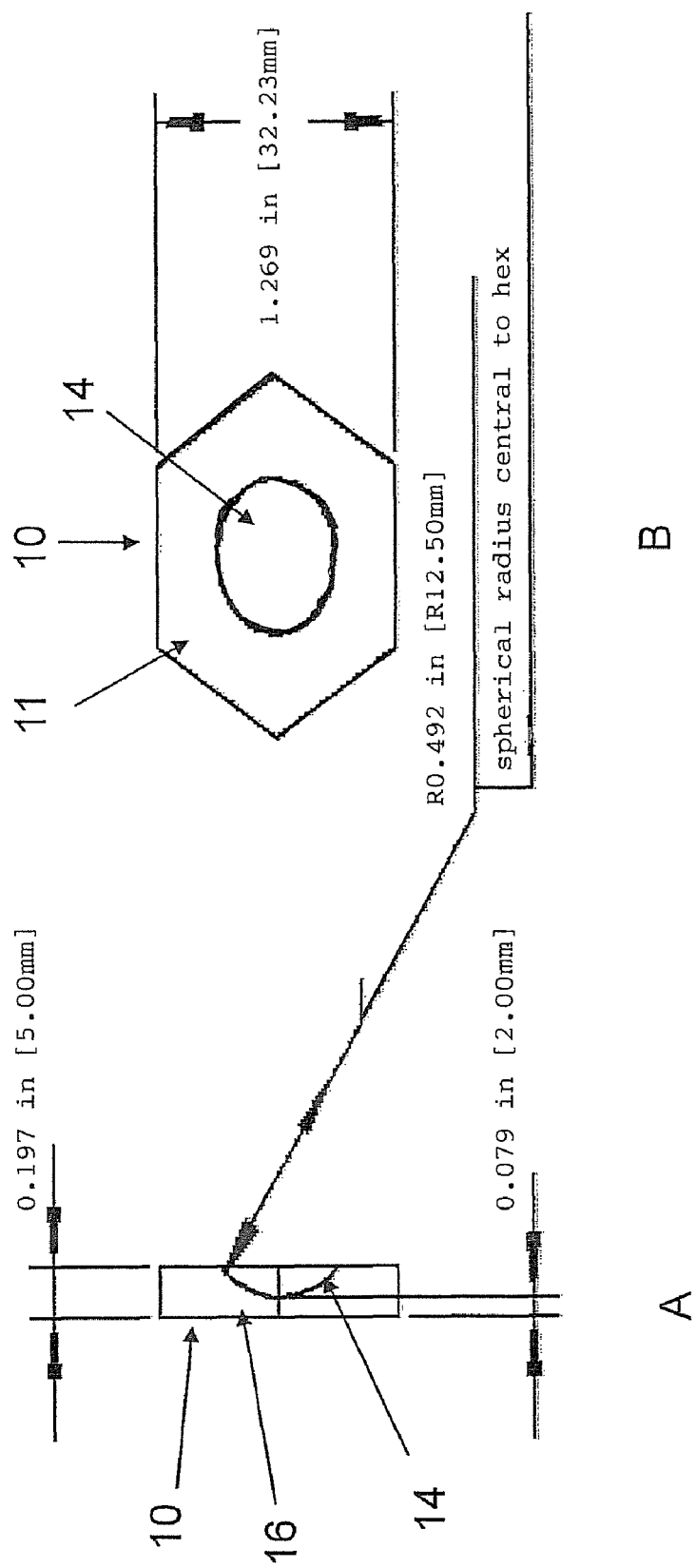
FIG. 11A is a cross-sectional representation of a hexagonal concave cell showing the dimensions of 9 cm$^2$ area and 5 mm thickness.
FIG. 11B is a representation of a hexagonal concave cell with a general view.

A ball bur bit about 1 inch in diameter was used to modify a flat cell to the concave cell. The concave surface is in the cell center. For a scintillating cell with 9 cm$^2$ area and about 5 mm thickness, the depth of the spherical segment was about 3 mm or about 60% of the cell thickness, as shown in FIG. 11A.

FIG. 5 illustrates and compares a flat unmodified cell on the left with a concave cell 10 to the right. The edges (sides 13) of the cells are painted in white reflective coating EJ-510 from Eljen Technology. The bottom (the unmodified flat surface) of the cells are wrapped in VM2000® reflective material from 3M. At the top (directly across from the concave surface) the cells usually were covered in TYVEK® from DuPont with the opening in the center about 5 mm in diameter for the photo detector. This is the reflective surface 20.

Figure 1:
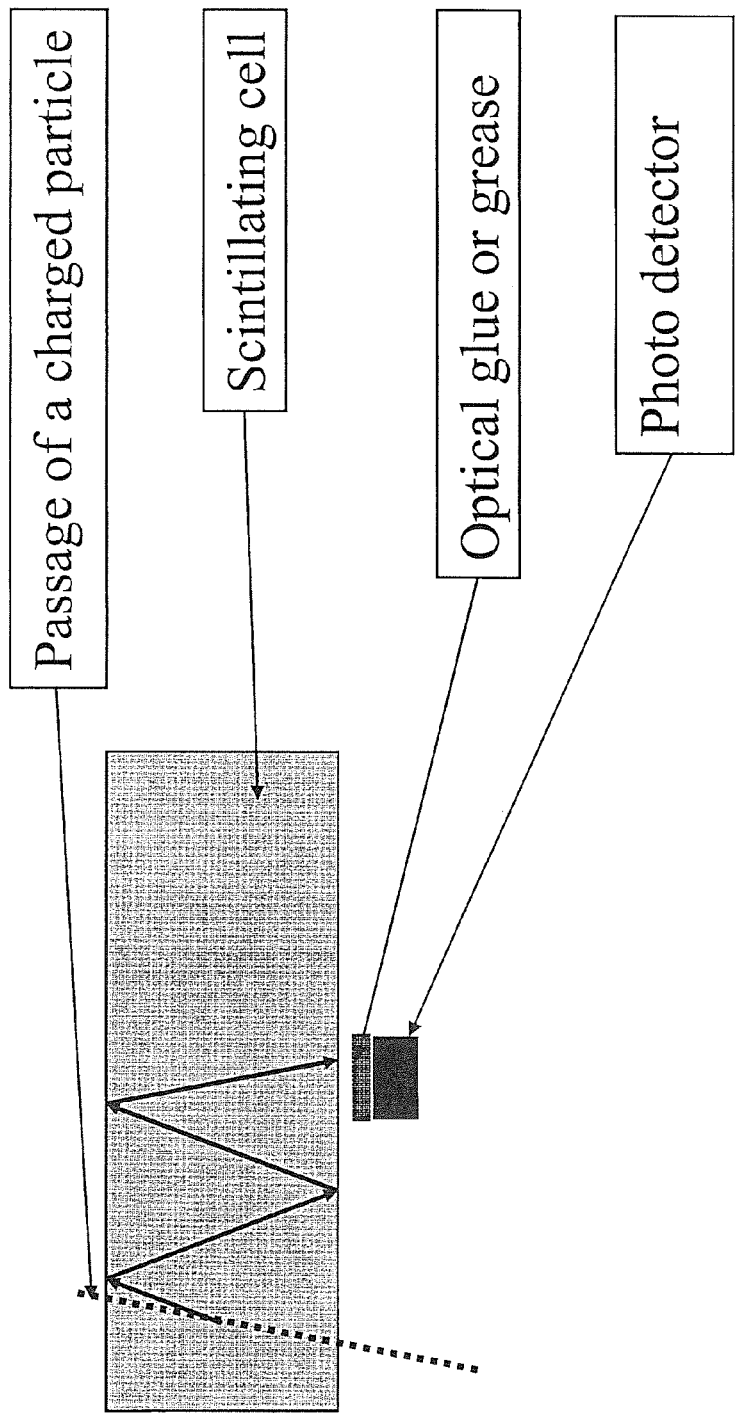
FIG. 1 is a representation of current methods of light collection with optical grease.
Figure 2:
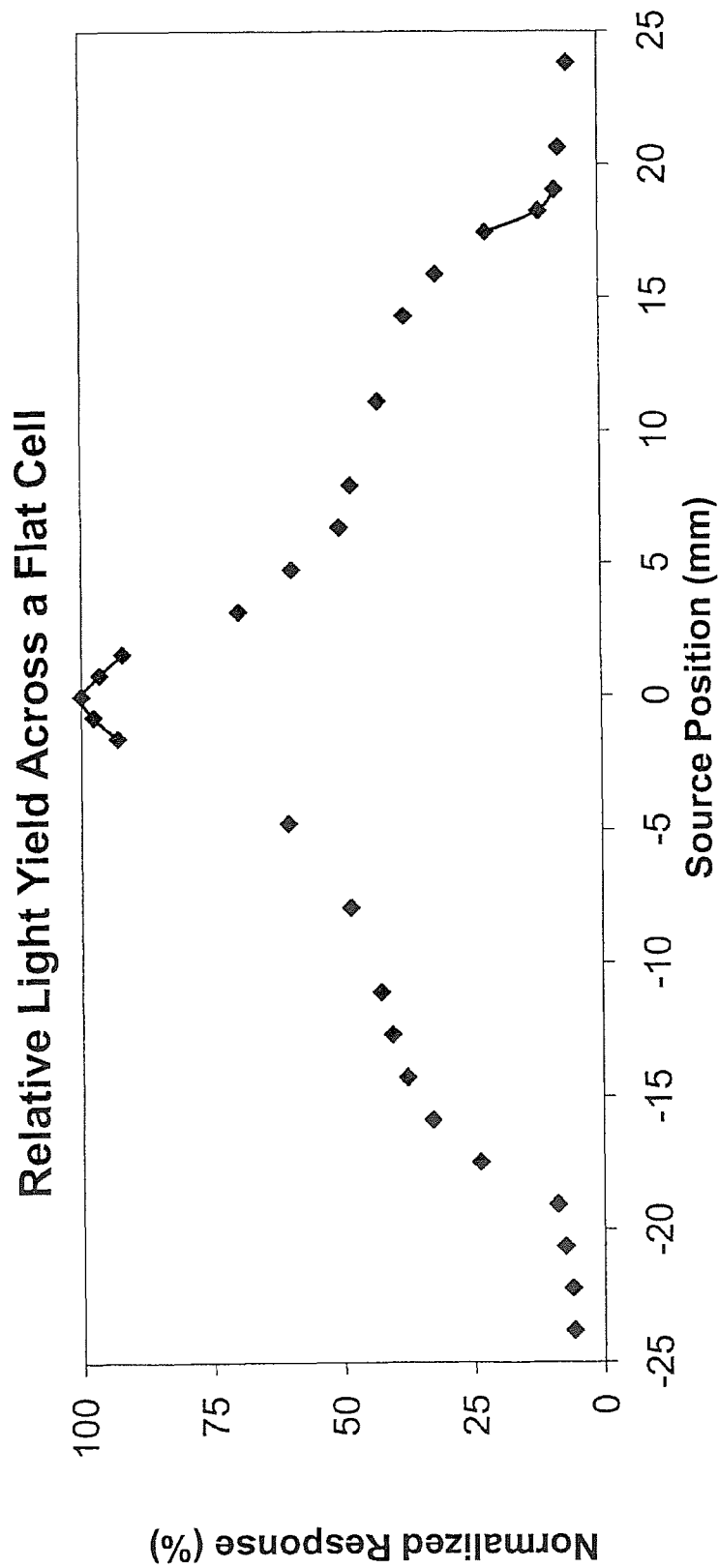
FIG. 2 is a graph of current methods of light uniformity response in the prior art.
Figure 7:
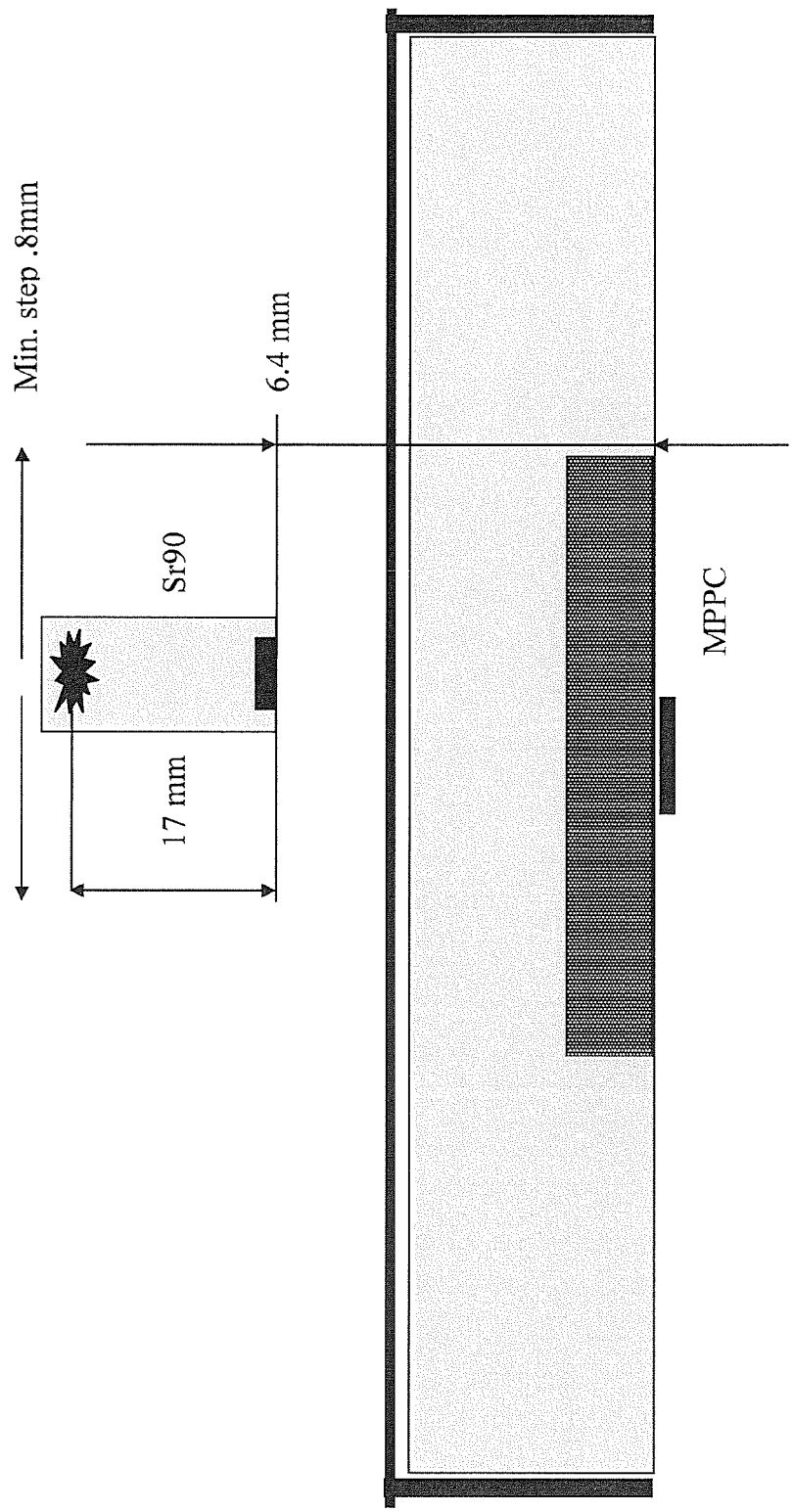
FIG. 7 is a schematic of the cell scan setup.
Figure 8:
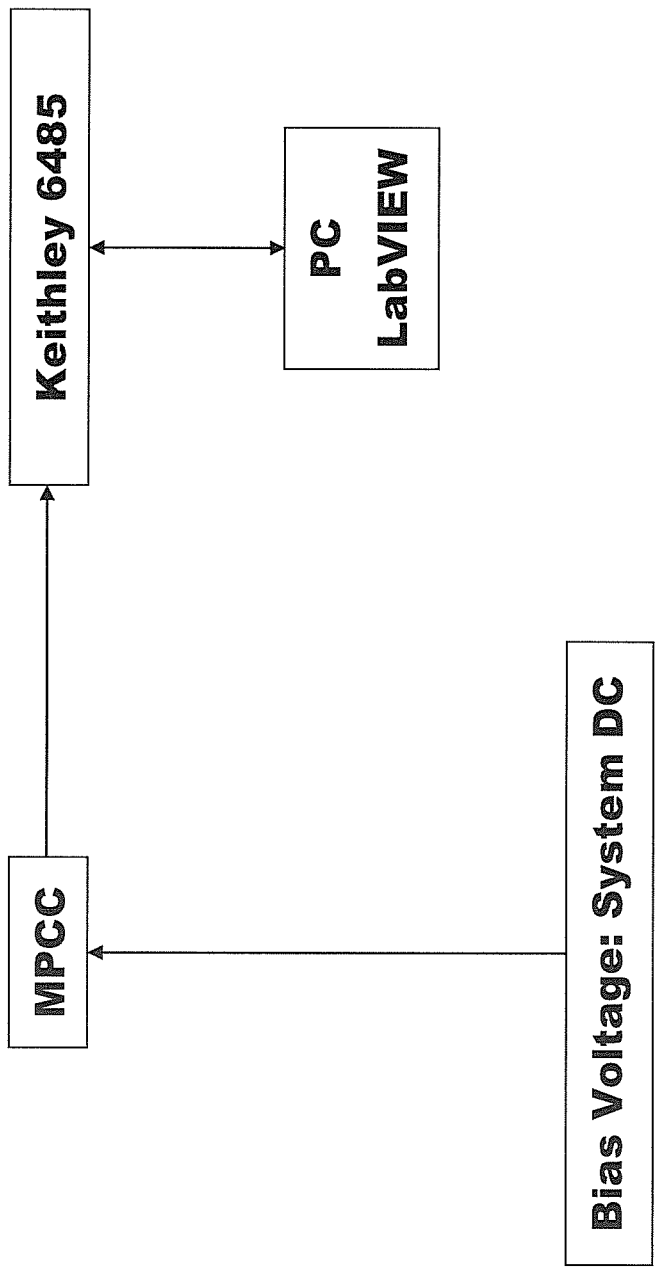
FIG. 8 is a schematic of the current measurement setup.
Figure 9:
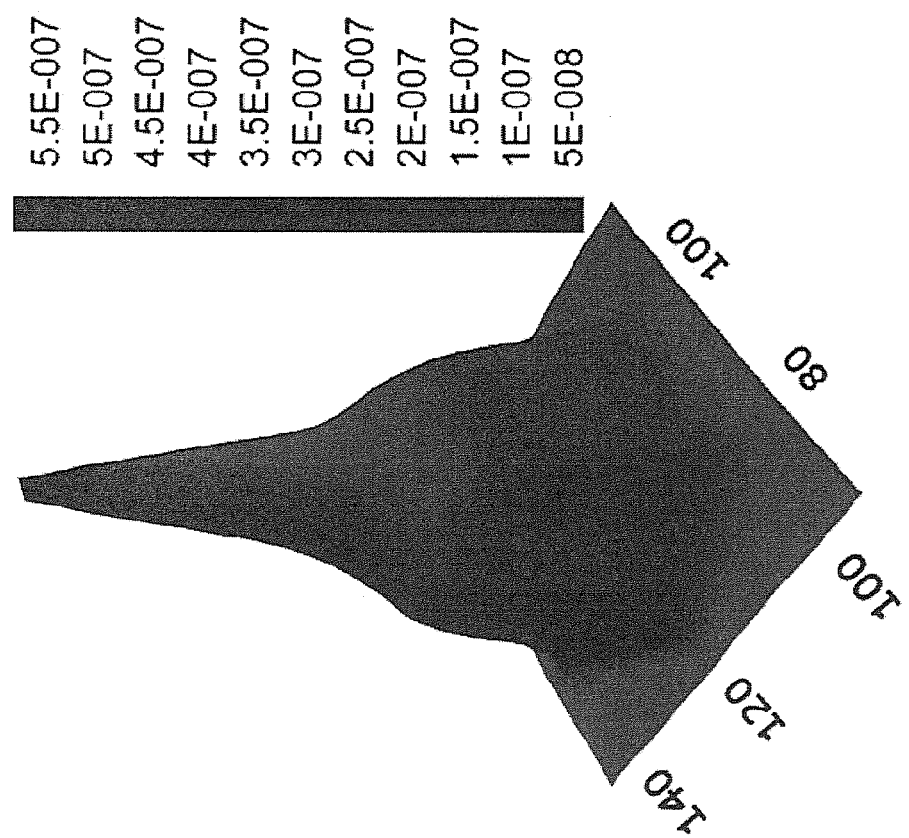
FIG. 9 is 3-dimensional graph of the scintillating cell response of the prior art.
Figure 10:
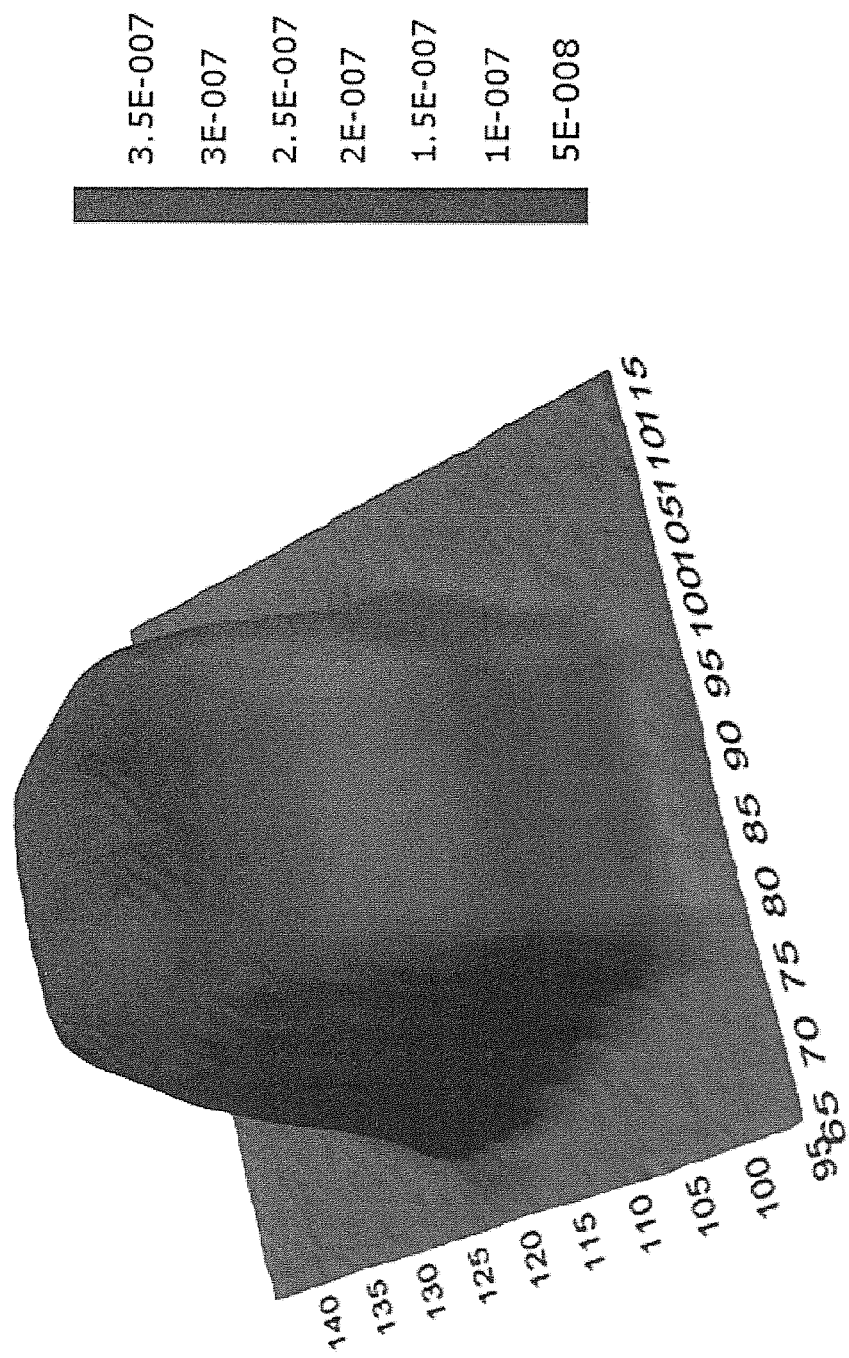
FIG. 10 is a 3-dimensional graph of the scintillating cell response of the concave cell of the present invention.

The uniformity of light collection with respect to the particle impact position on the cell was measured using the scan setup schematic shown in FIG. 7. The Sr90 radioactive source on the top of the cell irradiates the cell through its collimator opening of 0.8 mm. The source was position on the cell by hand, as shown in FIGS. 2 and 4, or using precision positioning tables, as shown in FIGS. 9 and 10. The Hamamatsu MPPC was used as a photo detector. The photo detector output current measurement setup is shown in FIG. 8. It includes the photo detector, low voltage power supply, picoammeter, and a PC with LabVIEW from National Instruments. The three dimensional graphs of scintillating cell response measured using precision positioning tables for a collimated Sr90 radioactive source are shown in FIG. 9 for the prior art or flat cell and in FIG. 10 for the concave cell of the present invention. The uniformity of the prior art cell is significantly different from the concave cell of the present invention.

EXAMPLE 2

The following studies of the concave cell made of a cast scintillator were performed. First, the effect of the diameter of a dimple on the cell uniformity response was examined. Second, the effect of an area or a thickness on the uniformity was examined. Last, scintillation cells with an area of 9 cm$^2$ and 5 mm thickness were produced using the injection molding process. The studies were performed using the same collimated radioactive source Sr90 and the same photo detector S10362-11-050C from Hamamatsu as was used above.

For the cell with an area of 9 cm$^2$ and 5 mm thickness, the optimal depth of the spherical segment of the concave surface (dimple), as shown in FIG. 11A, is about 3 mm or about 60% of the cell thickness. In such a case, a ball bur bit about 25 mm in diameter produces a dimple that has a diameter of about 16.2 mm on the cell surface. By using ball bur bits of different diameters, a set of cells that had the same thickness, area, and depth of dimple (about 3 mm) were produced. The cells had a dimple diameter from 13 to 19 mm. The cell responses were uniform regardless of the dimple's diameter.

Flat and concave cells with an area of about 4 cm$^2$ and square in shape were tested. The cells had a thickness of 5, 4, and 3 mm. The response of the flat cell was compared with the response of the concave cell that had the same thickness. The concave cells with the spherical dimple of about 60% of the cell thickness provide a uniform response.

The injection molding process was tested for the production of flat and concave hexagonal cells. Chips made of an extruded scintillator were used as the injection material. Because the injection molding is sensitive to the parameters of process, different amount of time, pressure, and temperature were examined to optimize the molding process to the given material. As a result, good quality single cells were produced in about a 20 seconds cycle. The measured response of the molded concave cell was more uniform than the response of the molded flat cell. However, the response of the molded concave cell was not completely uniform throughout the cell area, as it was for the cell made of the cast scintillator. It could be because of a higher light absorption in the material (double melted extrusive scintillator) that was used. Polystyrene pellets can be used to optimize the injection molding process. In the next test, the polystyrene pellets that are optimized to the injection molding process will be used. The original polystyrene pellets for the extruded scintillator had the melt flow rate at about 2 g/10 minutes. For the new test, the polystyrene pellets have the melt flow rate at about 8 g/10 minutes.

In addition, to verify an optimal position for the photo detector inside a dimpled cell, a set of measurements was performed at different "depths" inside the dimple. The different position of the photo detector inside the dimple affects the uniformity of the cell response. For the uniform response, the photo detector should be even with the flat part of the concave side of the cell.

Moreover, an optical cross talk between the neighboring concave cells was estimated. Two hexagonally shaped cells were positioned side-by-side, as close as possible. The current measurements were performed for both photo detectors. The collimated radioactive source was moved across the cell's boundary. If the source was positioned within one cell, the normalized response of the neighboring cell was within a few percent.

Furthermore, the flat and concave cells as in FIGS. 11A and 11B made of an extruded scintillating strip were also tested. The uniformity of light response of the flat cell made of extruded scintillator is similar to the uniformity of the flat cell made of a cast scintillator. The concave cell made of extruded scintillator provides uniform response similar to the response of the concave cell made of a cast scintillator. The uniformity of cells made of an extruded scintillator was not sensitive to the direction of the extrusion.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention may be practiced otherwise than as specifically described.

REFERENCES

1. D'Ascenzo, et al. Study of Micro Pixel Photon Counters for a high granularity scintillator-based hadron calorimeter. arXiv:0711.1287v1 (Nov. 8, 2007).
2. Danilov, M. Scintillator tile hadron calorimeter with novel SiPM readout. Nuclear Instruments and Methods in Physics Research A 581 (2007) 451-456.

The invention claimed is:

1. A concave cell for the collection of radiated light comprising a body made from a material chosen from the group consisting of a cast scintillator and an extruded scintillator and including a concave surface and an unmodified flat surface coated in a reflective material opposite to said concave surface, and wherein sides of said body are coated in a reflective material, and a reflective surface coupled to said body creating a volume of air between said concave surface and said reflective surface, said reflective surface including an opening and a photo detector directly adjacent to said reflective surface.

2. The concave cell of claim 1, wherein said photo detector faces the concave cell through a volume of air restricted in between said concave surface and said reflective surface.

3. The concave cell of claim 1, wherein said photo detector is further defined as being directly coupled to said concave cell without intervening medium.

4. The concave cell of claim 3, wherein a window of said photo detector is flush with said reflective surface and positioned across from a flat part of said concave surface.

5. The concave cell of claim 1, manufactured by a process chosen from the group consisting of double-rotating technique, ball bit fabrication, injection molding, and a heating and dimpling process.

6. The concave cell of claim 1, having an area of 4 to 9 $cm^2$ and a thickness of 3 to 5 mm.

7. The concave cell of claim 1, wherein the amount of concavity of said concave surface is at least 50% of the thickness of said concave cell.

8. The concave cell of claim 7, wherein the amount of concavity of said concave surface is 60% of the thickness of said concave cell.

9. The concave cell of claim 1, having a shape chosen from the group consisting of a hexagon and a square.

10. The concave cell of claim 1, wherein said reflective material is chosen from the group consisting of reflective coating, foil, and paint.

11. The concave cell of claim 1, wherein said opening corresponds to an active area of said photo detector.

12. A plurality of concave cells of claim 1.

13. A method of collecting light, including the steps of: reflecting light inside a concave cell comprising a body including a concave surface and an unmodified flat surface opposite to the concave surface, and a reflective surface coupled to the body creating a volume of air between the concave surface and the reflective surface, the reflective surface including an opening and a photo detector directly adjacent to the reflective surface; striking the light at the concave surface; scattering the light at the concave surface; and registering the scattered light with the photo detector.

14. The method of claim 13, wherein the photo detector is further defined as being directly coupled to the concave cell without intervening medium.

15. The method of claim 14, wherein a window of the photo detector is flush with the reflective surface and positioned across from a flat part of said concave surface.

16. The method of claim 13, wherein the concave cell is manufactured from material chosen from the group consisting of a cast scintillator and an extruded scintillator.

17. The method of claim 13, wherein the concave cell is manufactured by a process chosen from the group consisting of ball bit fabrication, injection molding, and a heating and dimpling process.

18. The method of claim 13, wherein the concave cell has an area of 4 to 9 cm.sup.2 and a thickness of 3 to 5 mm.

19. The method of claim 13, wherein the amount of concavity of the concave surface is at least 50% of the thickness of the concave cell.

20. The method of claim 19, wherein the amount of concavity of the concave surface is 60% of the thickness of the concave cell.

21. The method of claim 13, wherein the concave cell is a shape chosen from the group consisting of a hexagon and a square.

22. The method of claim 13, wherein the unmodified flat surface and sides of the body are coated in a reflective material.

23. The method of claim 22, wherein the reflective material is chosen from the group consisting of reflective coating, foil, and paint.

24. The method of claim 13, wherein the opening is approximately 1 to 5 mm in diameter and corresponds to an active area of the photo detector.

25. The method of claim 13, used in an application chosen from the group consisting of solid state scintillation detectors, Cerenkov detectors, scintillator-based calorimeters, radiation monitoring, medical physics, educational products, mass spectroscopy, and high performance liquid chromatography (HPLC).

26. A method of increasing uniformity of light registered in a photo detector, including the steps of: reflecting light inside a concave cell comprising a body including a concave surface and an unmodified flat surface opposite to the concave surface, and a reflective surface coupled to the body creating a volume of air between the concave surface and the reflective surface, the reflective surface including an opening and a photo detector directly adjacent to the reflective surface; striking the light at the concave surface; scattering the light at the concave surface; and registering the scattered light with the photo detector with uniformity.

27. A method of making a concave cell, including the steps of: preparing an unmodified flat surface and a concave surface opposite to said unmodified flat surface from a body; coating the unmodified flat surface with reflective material; coupling a reflective surface to the body creating a volume of air between the concave surface and the reflective surface, creating a volume of air between the concave surface and the reflective surface; and coupling a photo detector to the reflective surface at an opening in the reflective surface.

28. The method of claim 27, wherein said preparing the concave surface is chosen from a method consisting of fabricating with ball bits, injection molding, and heating and dimpling.

29. The method of claim 28, wherein said heating and dimpling step is further defined as heating the concave cell to the melting point and dimpling a surface of the body with high pressure to form the concave surface.

30. The method of claim 27, wherein said coating step further includes coating sides of the body.

* * * * *